(12) United States Patent
Shigyou et al.

(10) Patent No.: US 10,385,998 B2
(45) Date of Patent: Aug. 20, 2019

(54) FIXING STRUCTURE FOR SEAL MEMBER IN FLUID CONTROL APPARATUS, JOINT, AND FLUID CONTROL APPARATUS

(71) Applicant: FUJIKIN INCORPORATED, Osaka-shi (JP)

(72) Inventors: Kohei Shigyou, Osaka (JP); Takashi Hirose, Osaka (JP); Kouji Nishino, Osaka (JP); Ryousuke Dohi, Osaka (JP); Naofumi Yasumoto, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/562,944

(22) PCT Filed: Aug. 10, 2016

(86) PCT No.: PCT/JP2016/073520
§ 371 (c)(1),
(2) Date: Sep. 29, 2017

(87) PCT Pub. No.: WO2017/033745
PCT Pub. Date: Mar. 2, 2017

(65) Prior Publication Data
US 2018/0112805 A1    Apr. 26, 2018

(30) Foreign Application Priority Data

Aug. 24, 2015 (JP) .................................. 2015-164439

(51) Int. Cl.
*G05D 7/00* (2006.01)
*F16K 27/00* (2006.01)
(Continued)

(52) U.S. Cl.
CPC .............. *F16L 23/02* (2013.01); *F16K 27/00* (2013.01); *F16K 51/00* (2013.01); *G05D 7/00* (2013.01)

(58) Field of Classification Search
CPC . F16K 27/00; F16K 51/00; G05D 7/00; F16L 23/02; Y10T 137/87885
See application file for complete search history.

(56) References Cited

U.S. PATENT DOCUMENTS 3,654,960 A * 4/1972 Kiernan .............. F15B 13/0817
                                                          137/271
9,114,788 B2 * 8/2015 Scharpf ................... B60T 17/04
(Continued)

FOREIGN PATENT DOCUMENTS

JP    2005-149075 A    6/2005
JP    2007-321833 A    12/2007
(Continued)

OTHER PUBLICATIONS

International Search Report dated Oct. 25, 2016, issued for PCT/JP2016/073520.

*Primary Examiner* — Angelisa L. Hicks
(74) *Attorney, Agent, or Firm* — Locke Lord LLP

(57) ABSTRACT

Passage members each have a required width, a required height, and a required length, and are provided at middle portions in the width direction with fluid passages, respectively. As coupling means, two bolts are used. The middle portion in the width direction of each of the passage members has opposite end portions that are each provided with a female screw and a bolt insertion hole to be faced by the female screw, respectively. The upper bolt is inserted into one of the passage members and is screwed into the female screw of the other passage member. The lower bolt is inserted into the other passage member and is screwed into the female screw of the one of the passage members. The (Continued)

passage members are coupled with use of the two upper and lower bolts whereby a seal member is securely fixed.

15 Claims, 6 Drawing Sheets

(51) Int. Cl.
*F16K 51/00* (2006.01)
*F16L 23/02* (2006.01)

(56) References Cited

U.S. PATENT DOCUMENTS

| | | |
|---|---|---|
| 2009/0165872 A1 | 7/2009 | Moriya et al. |
| 2010/0132819 A1* | 6/2010 | Nakata ................. F16K 27/003 137/561 R |
| 2012/0211100 A1* | 8/2012 | Morgan ................ F16K 27/003 137/561 A |
| 2014/0333067 A1 | 11/2014 | Okabe et al. |
| 2016/0349763 A1 | 12/2016 | Hirose et al. |

FOREIGN PATENT DOCUMENTS

| | | |
|---|---|---|
| JP | 2013-68268 A | 4/2013 |
| JP | 2015-109022 A | 6/2015 |
| WO | 2007/141828 A1 | 12/2007 |

\* cited by examiner

FIXING STRUCTURE FOR SEAL MEMBER IN FLUID CONTROL APPARATUS, JOINT, AND FLUID CONTROL APPARATUS

TECHNICAL FIELD

The present invention relates to a fixing structure for a seal member in a fluid control apparatus, a joint, and a fluid control apparatus. In particular, the present invention relates to a fixing structure for a seal member suitable for use in a fluid control apparatus that is desired to have a narrower width, a joint having the fixing structure for the seal member, and a fluid control apparatus having the fixing structure for the seal member.

BACKGROUND ART

In the fluid control apparatus used for semiconductor manufacturing equipment, integration has been progressing, which is made by such a manner that passage members of a plurality of fluid control devices butt against each other via a seal member and are coupled by means of bolts (e.g. Patent Literature 1).

In such a fluid control apparatus, in order to couple a pair of passage members, the passage members are, in most cases, coupled by means of four bolts that are placed in four corners of the passage members so as not to reach a fluid passage, whereby the seal member is securely fixed.

CITATION LIST

Patent Literature

Patent Literature 1: Japanese Unexamined Patent Application Publication JP-A-2005-149075

SUMMARY OF INVENTION

Technical Problem

In the integrated fluid control apparatus, reduction in an installation area thereof is desired. To address this issue, reduction in the width of the passage members constituting the fluid control apparatus has been a problem to be solved.

Placing four bolts in four corners of the passage member causes an obstacle to reduction in width of the fluid control device. Therefore, placing two bolts in the center of the passage member in the width direction and coupling adjacent passage members with the two bolts have been desired. However, when the passage members are to be coupled with two bolts, there is a need for providing two bolt insertion holes, that is, two through holes, which are symmetrically placed with respect to a seal area. Because the passage member is provided with a fluid passage, there arises a problem that providing two through holes so as not to reach the fluid passage is difficult.

An object of the present invention is to provide a fixing structure for a seal member in a fluid control apparatus, a joint, and a fluid control apparatus, which allow coupling of passage members by using two bolts.

Solution to Problem

A fixing structure for a seal member in a fluid control apparatus in accordance with a first aspect of the present invention (an invention according to claim 1) is a fixing structure for a seal member in a fluid control apparatus, comprising: block-shaped first and second passage members having fluid passages that communicate with each other; a seal member interposed in an abutment portion of the first and second passage members; and coupling means for coupling the first and second passage members, wherein each of the passage members has a required width, a required height, and a required length; each of the passage members is provided at a middle portion in a width direction thereof with a fluid passage; two bolts are used as the coupling means; the middle portion in the width direction of the first and the second passage members has opposite end portions that are each provided with a female screw and a bolt insertion hole to be faced by the female screw; and the first passage member and the second passage member are coupled by a first bolt that is inserted into the bolt insertion hole of the first passage member and is screwed into the female screw of the second passage member and a second bolt that is inserted into the bolt insertion hole of the second passage member and is screwed into the female screw of the first passage member whereby the seal member is securely fixed.

A fixing structure for a seal member in a fluid control apparatus in accordance with a second aspect of the present invention (an invention according to claim 8) is a fixing structure for a seal member in a fluid control apparatus, comprising: block-shaped first and second passage members having fluid passages that communicate with each other; a seal member interposed in an abutment portion of the first and second passage members; and coupling means for coupling the first and second passage members, wherein each of the passage members has a required width, a required height, and a required length; each of the passage members is provided at a middle portion in a width direction thereof with a fluid passage; two bolts are used as the coupling means; the seal member is a gasket-type filter, the gasket-type filter has a diameter that is equivalent to a width of the first passage member and the second passage member; and a filter receiving recess provided at the first passage member and the second passage member is formed so as to be exposed to an outside in a width direction thereof.

The fluid control apparatus, for example, includes: a fluid control device in which a body (equivalent to one of the passage members) having a fluid passage is provided with a required control unit so as to control flow rate and control opening and closing operations; and passage blocks (equivalent to the other of the passage members) on an inlet side and an outlet side, which are coupled to the fluid control device.

The fluid control apparatus may be a pressure-based flow rate controller. This pressure-based flow rate controller includes: a gasket-type orifice for controlling flow rate; a control valve provided on the upstream side of the gasket-type orifice; and an upstream-side pressure sensor that is provided between the gasket-type orifice and the control valve and detects the upstream-side pressure of the gasket-type orifice. Such a pressure-based flow rate controller is designed to feedback control the flow rate of the fluid passing through the orifice by opening/closing the control valve using the upstream-side pressure of the gasket-type orifice, or the upstream-side and downstream-side pressures of the gasket-type orifice.

In addition, the fluid control apparatus may include: a plurality of fluid control devices each having a body (equivalent to the passage member) provided with a fluid passage; and a block-shaped joint member (equivalent to the passage member) for causing these fluid control devices to communicate with each other.

Both of the first and second passage members may be bodies provided integrally with a control unit (a portion having required functions of controlling flow rate, opening/closing operations, and the like). Alternatively, one of the first and second passage members may be provided integrally with the control unit and the other may be an independent member (for example, a block-shaped joint member).

The passage members of the fluid control apparatus are coupled via the seal member. The seal member is securely fixed by the passage members being coupled with bolts.

The coupling of the passage members with the bolts is generally performed by: providing a plurality of bolt insertion holes at one of the passage members and providing a female screw corresponding to each of the bolt insertion holes at the other of the passage members; and screwing a bolt from the side of the one of the passage members.

In this case, the bolt insertion hole needs to be provided so as not to reach the fluid passage of the passage member. Conventionally, the bolt insertion holes are formed in four corners of the passage member, which prevents the bolt insertion holes and the fluid passage from interfering with each other.

In contrast, in the present invention, the fixing structure for a seal member allows the fluid control apparatus to have a narrower width. In the fluid control apparatus having a required width, a required height, and a required length, and including a fluid passage at a middle portion in the width direction, the coupling of the passage members with use of four bolts as in the conventional manner is replaced by the coupling of the passage members with use of two bolts. The two bolts are arranged so as to extend in directions opposite to each other. Each bolt is arranged in the middle, of the width direction, of each of the opposite end portions that are located in the length direction of the abutment portion.

Providing the two bolts so as to extend in directions opposite to each other causes the bolts to be less likely to be loosen, as compared to the case where two bolts are fastened in the same direction, whereby the fixing structure for a seal member in accordance with the present invention has increased resistance against vibration.

In some cases, depending on the shape of the fluid passage, it is impossible to provide two bolt insertion holes in the middle of the width direction of the opposite end portions located in the length direction of the passage members, while preventing the bolt insertion holes from reaching the fluid passage provided in each of the passage members. However, in the fixing structure for the seal member in accordance with the present invention, one of the two bolt insertion holes is provided at either of the first and second passage members, whereby forming the bolt insertion hole so as not to reach the fluid passage is facilitated, which allows the coupling of the passage members by using the two bolts. Specifically, although the passage member conventionally needs to have a width for accommodating two bolts to be arranged side by side in the width direction, the present invention allows the passage member to have a width narrower than twice the diameter of the bolt, which enables the fluid control apparatus to have a narrower width.

The fluid passage provided in the passage member may be shaped in various manners, including I-shaped, L-shaped, V-shaped, U-shaped, and the like depending on its application purpose. The bolt insertion hole and the female screw are provided in the passage member, in view of the shape of the fluid passage.

At least one of the passage members has a bending (for example, L-shaped) fluid passage in some cases. In the case where an L-shaped fluid passage is provided in the middle portion in the width direction, it is difficult to use two bolts and prevent the two bolts from reaching the fluid passage at the same time. However, as described above, providing the two bolts so as to extend in directions opposite to each other prevents the bolts and the fluid passage from interfering with each other, even in the case of the L-shaped fluid passage.

The bending fluid passage consists of: a first passage that is open to an abutment surface and is orthogonal to or inclined with respect to the abutment surface; and a second passage that is orthogonal to or inclined with respect to the first passage and is open to a surface that is orthogonal to the abutment surface.

The seal member is, for example, a gasket, and may be a gasket-type filter that additionally has the function of a filter, or also may be a gasket-type orifice that additionally has the function of an orifice.

The gasket-type orifice is constituted by: first and second orifice bases (a portion corresponding to the gasket) that are fit to each other; and an orifice plate secured between respective abutment surfaces of these orifice bases. A seal surface is formed by opposite end surfaces of each orifice base being brought into contact with each of the passage members.

The gasket-type filter is constituted by: a filter base (a portion corresponding to the gasket); and a filter element attached to the filter base. A seal surface is formed by opposite end surfaces of the filter base being brought into contact with the passage members.

To provide a fluid control apparatus having a narrower width thereof, the passage member is designed to be narrower in the width direction, and along with this, the seal member is also designed to be narrower in the width direction. However, when the diameter of the gasket-type filter is reduced along with the reduction in width of the passage member, there arises a risk that a required flow rate cannot be secured. To address this issue, the gasket-type filter is designed to have the diameter that is equivalent to the width of the first passage member and the second passage member (alternatively, the diameter that is greater than the width of the first passage member and the second passage member), and a filter receiving recess provided at the first passage member and the second passage member is formed so as to be exposed to an outside in a width direction thereof. This allows prevention of reduction in flow rate.

In the fixing structure for the seal member in the fluid control apparatus in accordance with the second aspect of the present invention, it is preferable that the middle portion in the width direction of the first and the second passage members has opposite end portions that are each provided with a female screw and a bolt insertion hole to be faced by the female screw and that the first passage member and the second passage member are coupled by a first bolt that is inserted into the first passage member and is screwed into the female screw of the second passage member, and a second bolt that is inserted into the second passage member and is screwed into the female screw of the first passage member, whereby the seal member is securely fixed.

The joint in accordance with the present invention is a joint comprising: block-shaped first and second passage members having fluid passages that communicate with each other; a seal member interposed in an abutment portion of the first and second passage members; coupling means for coupling the first and second passage members; and a fixing structure for the seal member, wherein the fixing structure for the seal member is the fixing structure for the seal member in the fluid control apparatus as in any of the above description.

The fluid control apparatus in accordance with the present invention is a fluid control apparatus comprising: block-shaped first and second passage members having fluid passages that communicate with each other; a seal member interposed in an abutment portion of the first and second passage members; coupling means for coupling the first and second passage members; and a fixing structure for the seal member, wherein the fixing structure for the seal member is the fixing structure for the seal member as in any of the above description.

Advantageous Effects of Invention

In a fixing structure for a seal member in a fluid control apparatus, a joint, and the fluid control apparatus, in accordance with the present invention, it is possible to couple passage members by using two bolts, which enables the fluid control apparatus to have a narrower width. In addition, providing the two bolts so as to extend in directions opposite to each other causes the bolts to be less likely to be loosened.

REFERENCE SIGNS LIST

Figure 1:
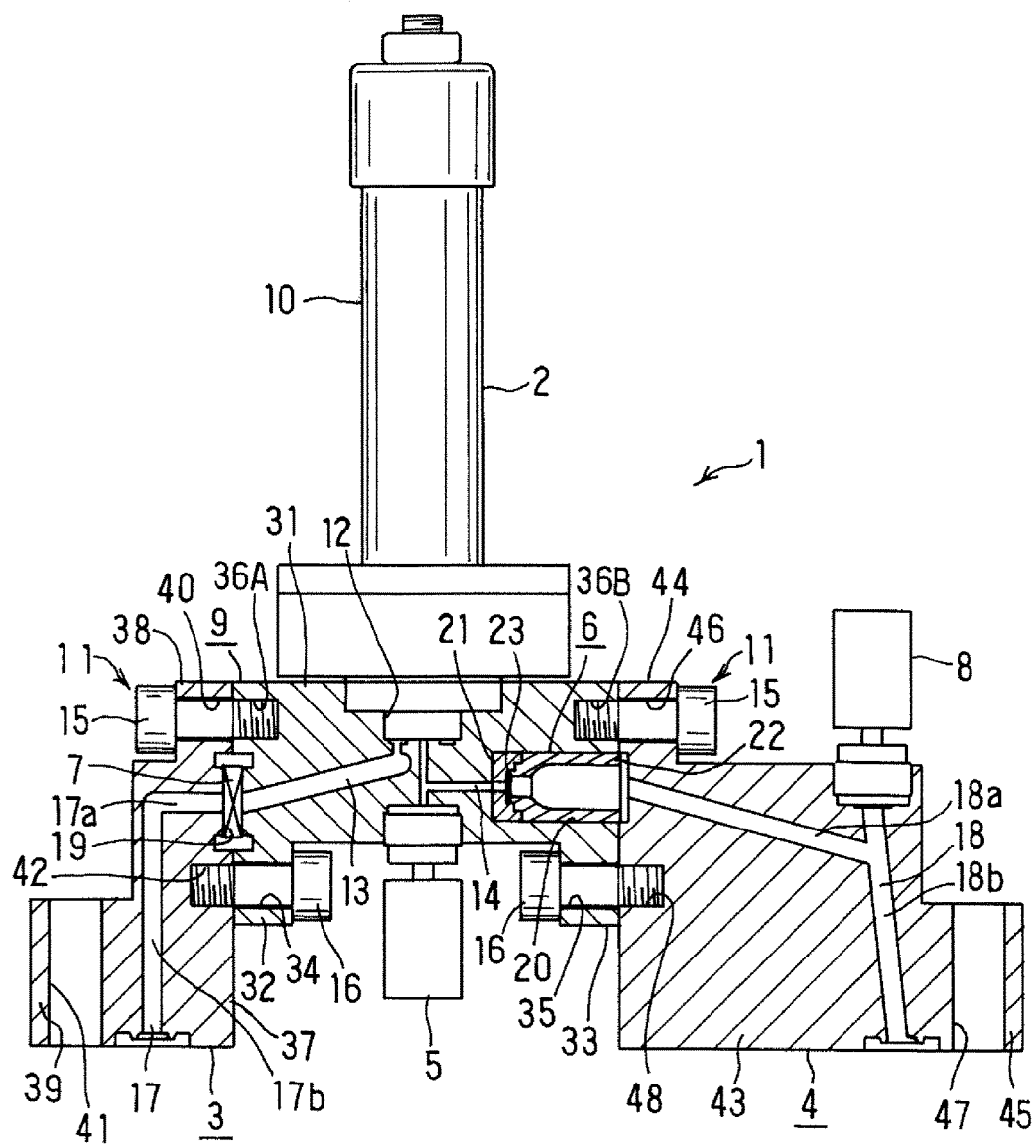
FIG. 1 is a sectional front view of a fixing structure for a seal member in a fluid control apparatus, a joint, and the fluid control apparatus, in accordance with first and second embodiments of the present invention.

1: fluid control apparatus
2: control valve
3: inlet-side passage block (passage member)
4: outlet-side passage block (passage member)
6: gasket-type orifice (seal member)
7: gasket-type filter (seal member)
9: body (passage member)
11: fixing structure for seal member
13: inlet passage
14: outlet passage
15, 16: bolt (coupling means)
17: inlet passage
18: outlet passage
34: first bolt insertion hole (bolt insertion hole)
35: second bolt insertion hole (bolt insertion hole)
36A, 36B: female screw
40, 46: first bolt insertion hole (bolt insertion hole)
42, 48: female screw

DESCRIPTION OF EMBODIMENTS

Embodiments of the present invention will be described below with reference to the drawings. In the following description, FIG. 1 is used as a reference for the direction, which shows the front side of the fluid control apparatus, and upper and lower sides of FIG. 1 are referred to as the upper and lower sides of the fluid control apparatus, respectively.

FIG. 1 shows an example of a fluid control apparatus to which a fixing structure 11 for a seal member in a fluid control apparatus, in accordance with the present invention, is applied. A fluid control apparatus 1 includes: a control valve 2; an inlet-side passage block (passage member) 3 provided on an inlet side of the control valve 2; an outlet-side passage block (passage member) 4 provided on an outlet side of the control valve 2; an upstream-side pressure sensor 5 provided on a body (passage member) 9 of the control valve 2; a gasket-type orifice 6 for controlling flow rate, which is provided on an abutment portion for coupling the body 9 of the control valve 2 and the outlet-side passage block 4; a gasket-type filter 7 provided on an abutment portion for coupling the inlet-side passage block 3 and the body 9 of the control valve 2; and a downstream-side pressure sensor 8 provided on the outlet-side passage block 4.

The fluid control apparatus 1 is referred to as a pressure type flow rate control device. The fluid control apparatus 1 allows feedback control of the flow rate of fluid passing through the orifice by opening/closing the control valve 2 using upstream-side pressure of the gasket-type orifice 6 or using upstream-side and downstream-side pressures of the gasket-type orifice 6.

The control valve 2 is a metal diaphragm valve of normally closed type. The control valve 2 includes: the body 9; and an actuator (not shown) that is accommodated within a casing 10 and opens and closes the fluid passage.

The body 9 is made of stainless steel and formed in the shape of a block. The body 9 includes: an inlet passage 13 having one end that is open to a left side surface (a surface that butts against the inlet-side passage block 3) and the other end that communicates with a valve chamber 12; and an outlet passage 14 having one end communicating with the valve chamber 12 and the other end that is open to a right side surface (a surface that butts against the outlet-side passage block 4) via the gasket-type orifice 6.

The inlet-side passage block 3 and the outlet-side passage block 4 are arranged on the left side and right side of the body 9 of the control valve 2, respectively, and are fixed to the body 9 of the control valve 2 by means of two bolts 15 and 16 as coupling means.

The inlet-side passage block 3 is made of stainless steel and formed in the shape of a block. The inlet-side passage block 3 includes an L-shaped inlet passage 17 having: one end that is open to a lower end of the inlet-side passage block 3; and the other end that is open to a right side surface (a surface that butts against the body 9 of the control valve 2) of the inlet-side passage block 3 and communicates with the inlet passage 13 of the body 9 of the control valve 2.

The inlet passage 17 includes: a first passage 17a that is open to the right side surface (an abutment surface) and is orthogonal to the right side surface; and a second passage 17b that is orthogonal to the first passage 17a and is open to a lower surface (a surface orthogonal to the abutment surface) of the inlet-side passage block 3.

The outlet-side passage block 4 is made of stainless steel and formed in the shape of a block. The outlet-side passage block 4 includes an L-shaped outlet passage 18 having: one end that is open to a left side surface (a surface that butts against the body 9 of the control valve 2) of the outlet-side passage block 4 and communicates with the outlet passage 14 of the body 9 of the control valve 2; and the other end that is open to a lower surface (a surface orthogonal to the abutment surface) of the outlet-side passage block 4.

The outlet passage 18 includes: a first passage 18a that extends obliquely downward toward the right from the abutment surface; and a second passage 18b that forms an obtuse angle with the first passage 18a and is open to the lower surface (the surface orthogonal to the abutment surface).

The left side surface of the body 9 (a surface that butts against the inlet-side passage block 3) and the right side surface of the inlet-side passage block 3 (the surface that butts against the body 9) are provided with respective recesses so as to be formed symmetrically. These recesses constitute a filter receiving recess 19 that receives the gasket-type filter 7.

A right side surface (a surface that butts against the outlet-side passage block 4) of the body 9 is provided with an orifice receiving recess 20 that is open to the outlet-side passage block 4 side and receives the gasket-type orifice 6.

The upstream-side pressure sensor 5 detects the upstream-side pressure of the gasket-type orifice 6. The downstream-side pressure sensor 8 detects the downstream-side pressure of the gasket-type orifice 6.

The gasket-type orifice 6 is obtained by securing a disc-shaped orifice plate 23 between abutment surfaces of a first orifice base 21 having the shape of a short cylinder and a second orifice base 22 having the shape of a long cylinder.

Figure 6A:
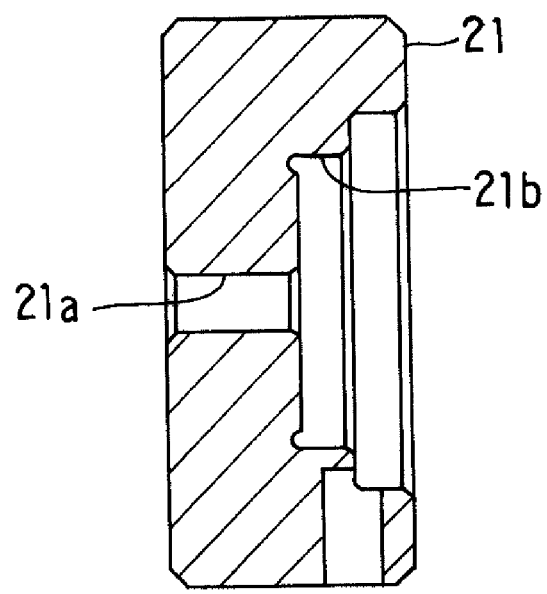
FIG. 6A is an enlarged view of a first orifice base of a gasket-type orifice.

As shown in FIG. 6A in an enlarged manner, the first orifice base 21 includes: an inlet-side passage 21a that communicates with the outlet passage 14 of the body 9 of the control valve 2 and extends to a middle portion, in the right-left direction, of the first orifice base 21; and a stepped recess 21b that is provided contiguously to a right end of the inlet-side passage 21a.

Figure 6B:
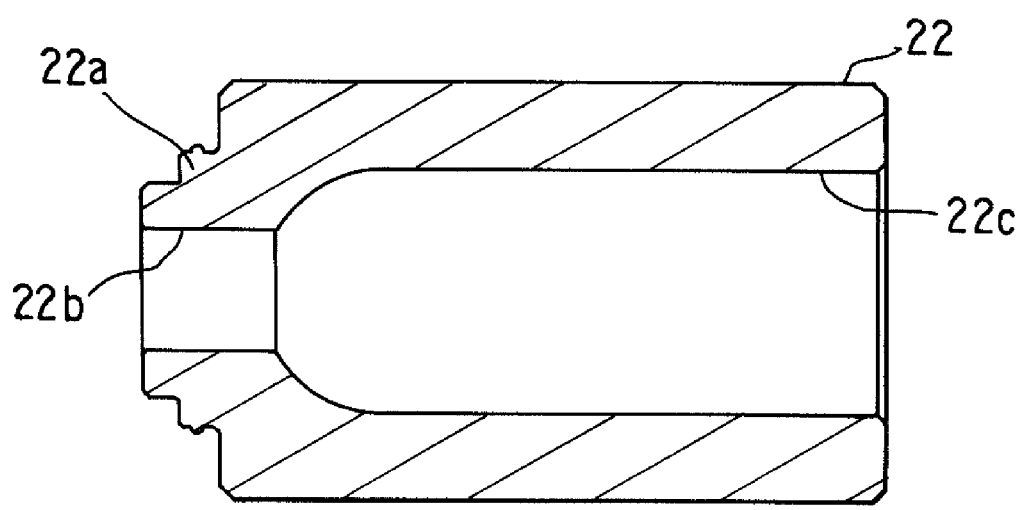
FIG. 6B is an enlarged view of a second orifice base of the gasket-type orifice.

As shown in FIG. 6B in an enlarged manner, the second orifice base 22 includes a stepped left end portion 22a. The stepped left end portion 22a is fitted into the recess 21b of the first orifice base 21 whereby the first orifice base 21 and the second orifice base 22 are integrated to secure the orifice plate 23 from both sides of the first and second orifice bases 21 and 22. The second orifice base 22 also includes: a first passage 22b that communicates with the inlet-side passage 21a of the first orifice base 21; and a second passage 22c that communicates with the first passage 22b and has a diameter larger than that of the first passage 22b.

The orifice plate 23 is formed by pressing an ultrathin sheet material made of stainless steel. The orifice plate 23 has a center portion that is provided with an orifice hole (not shown). The orifice hole includes: a tapered portion located on a high-pressure side (upstream side) of the fluid; and a straight portion that is contiguous to the tapered portion and is located on a low-pressure side (downstream side) of the fluid.

The gasket-type filter 7 is provided at the abutment portion of the inlet passage 13 of the body 9 of the control valve 2 and the inlet passage 17 of the inlet-side passage block 3, thereby securing a seal performance thereof and achieving a filtering function thereof.

Figure 7:
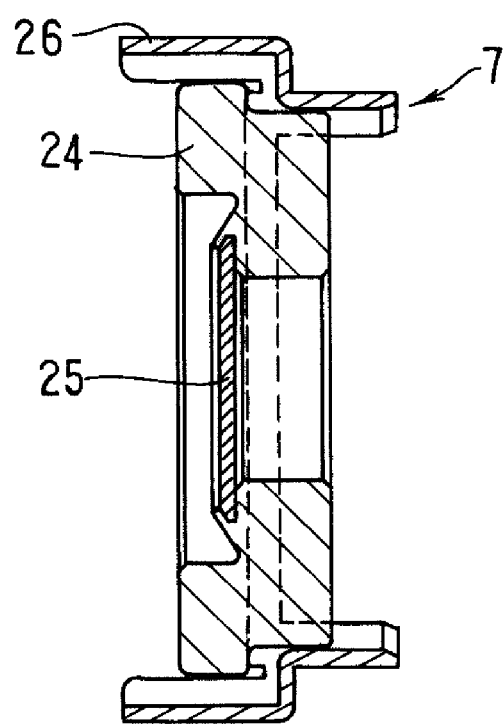
FIG. 7 is an enlarged view of a gasket-type filter.

As shown in FIG. 7 in an enlarged manner, the gasket-type filter 7 includes: an annular filter base 24 that is made of SUS316L-P (by double melting process) and communicates with the outlet passage 14 of the body 9; and a disc-shaped sintered filter element 25 attached to the filter base 24. The gasket-type filter 7 thus formed is held in a retainer 26, which is received by the filter receiving recess 19.

It should be noted that the gasket-type filter 7 is not limited to one as described above. For example, as for a filter element, instead of the sintered filter element 25, one that is formed by boring, with the process of etching, a large number of small holes through a portion excluding an outer peripheral portion of an ultrathin disc made of stainless steel, may be used.

The body 9 of the control valve 2 consists of: a passage forming portion 31 that is provided with the above-described inlet and outlet passages 13 and 14, and has the shape of a rectangular parallelepiped that is long in the right-left direction; a first bolt insertion hole forming portion 32 that is provided at a left end portion on a lower surface of the passage forming portion 31 so as to project downward and has the shape of a rectangular parallelepiped; and a second bolt insertion hole forming portion 33 that is provided at a right end portion on the lower surface of the passage forming portion 31 so as to project downward and has the shape of a rectangular parallelepiped.

The first bolt insertion hole forming portion 32 is provided with a first bolt insertion hole 34 that penetrates through the first bolt insertion hole forming portion 32 in the right-left direction. The second bolt insertion hole forming portion 33 is provided with a second bolt insertion hole 35 that penetrates through the second bolt insertion hole forming portion 33 in the right-left direction. The passage forming portion 31 is provided at a left side surface thereof with a female screw 36A that extends to the right. Specifically, the female screw 36A is provided at a position where the female screw 36A and the center of the first bolt insertion hole 34 have point symmetry with respective to the center of the filter receiving recess 19 on the left side surface of the passage forming portion 31. The passage forming portion 31 is provided at a right side surface thereof with a female screw 36B that extends to the left. Specifically, the female screw 36B is provided at a position where the female screw 36B and the center of the second bolt insertion hole 35 have point symmetry with respective to the center of the orifice receiving recess 20 on the right side surface of the passage forming portion 31.

The inlet-side passage block 3 consists of: a passage forming portion 37 that is provided with the above-described L-shaped inlet passage 17 and has the shape of a rectangular parallelepiped that is long in the up-down direction; a first bolt insertion hole forming portion 38 that is provided at a right portion on an upper surface of the passage forming portion 37; and a second bolt insertion hole forming portion 39 that is provided at a lower end portion on a left surface of the passage forming portion 37. The first bolt insertion hole forming portion 38 is provided with a first bolt insertion hole 40 that penetrates through the first bolt insertion hole forming portion 38 in the right-left direction. The second bolt insertion hole forming portion 39 is provided with a second bolt insertion hole 41 that penetrates through the second bolt insertion hole forming portion 39 in the up-down direction. The passage forming portion 37 is provided at a middle portion on a right side surface thereof with a female screw 42 that extends to the left. Specifically, the female screw 42 is provided at a position where the female screw 42 and the center of the first bolt insertion hole 40 have point symmetry with respective to the center of the filter receiving recess 19 on the right side surface of the passage forming portion 37.

The outlet-side passage block 4 consists of: a passage forming portion 43 that is provided with the above-described L-shaped outlet passage 18 and has the shape of a rectangular parallelepiped; a first bolt insertion hole forming portion 44 that is provided at a left end portion on an upper surface of the passage forming portion 43; and a second bolt insertion hole forming portion 45 that is provided at a lower end portion on a right surface of the passage forming portion 43. The first bolt insertion hole forming portion 44 is provided with a first bolt insertion hole 46 that penetrates through the first bolt insertion hole forming portion 44 in the right-left direction. The second bolt insertion hole forming portion 45 is provided with a second bolt insertion hole 47 that penetrates through the second bolt insertion hole forming portion 45 in the up-down direction. The passage forming portion 43 is provided at a middle portion on a left side surface thereof with a female screw 48 that extends to the right. Specifically, the female screw 48 is provided at a position where the female screw 48 and the center of the first bolt insertion hole 46 have point symmetry with respective to the center of the orifice receiving recess 20 on the left side surface of the passage forming portion 43.

Figure 2:
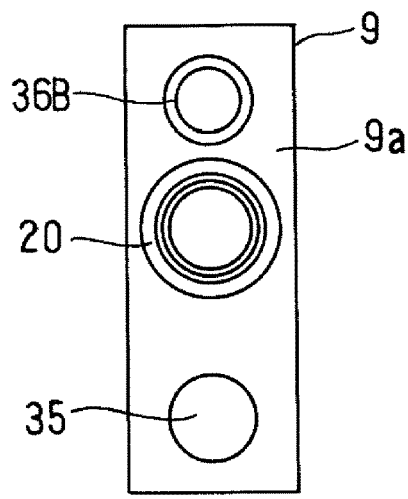
FIG. 2 is a right side view of a body of a control valve.

FIG. 2 is a view of the body 9 of the control valve 2 when seen from the outlet-side passage block 4 side. As shown in FIG. 2, the orifice receiving recess 20, the female screw 36B located above the orifice receiving recess 20, and the second bolt insertion hole 35 located below the orifice receiving recess 20 are exposed to an abutment surface 9a of the body 9, which butts against the outlet-side passage block 4. It is preferable that a distance from the center of the orifice receiving recess 20 to the center of the female screw 36B is equal to a distance from the center of the orifice receiving recess 20 to the center of the second bolt insertion hole 35.

Figure 3:
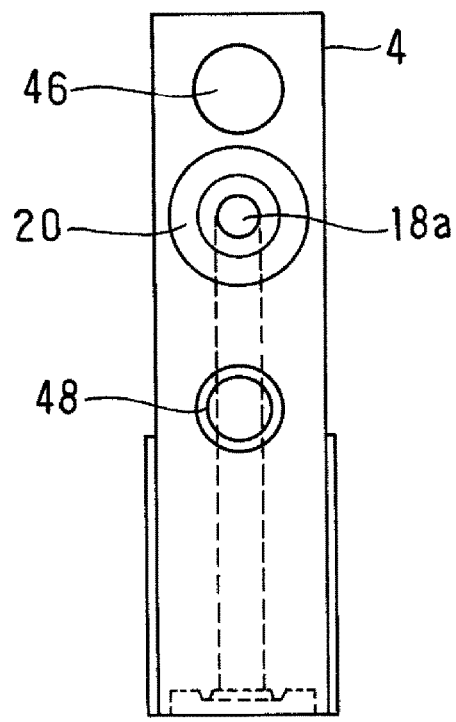
FIG. 3 is a left side view of an outlet-side passage block.

FIG. 3 is a view of the outlet-side passage block 4 when seen from the body 9 side of the control valve 2. As shown in FIG. 3, the orifice receiving recess 20, the first bolt insertion hole 46 located above the orifice receiving recess 20, and the female screw 48 located below the orifice receiving recess 20 are exposed to a right side surface (the abutment surface of the outlet-side passage block 4, which butts against the body 9) of the outlet-side passage block 4. It is preferable that a distance from the center of the orifice receiving recess 20 to the center of the first bolt insertion hole 46 is equal to a distance from the center of the orifice receiving recess 20 to the center of the female screw 48.

In the fixing structure 11 for a seal member in accordance with the first embodiment, the seal member is the gasket-type orifice 6. The fixing structure 11 is constituted by: two upper and lower bolts 15 and 16 as coupling means; female screws 36B and 48 respectively formed in two passage members 9 and 4, that is, the body 9 of the control valve 2 and the outlet-side passage block 4; and the bolt insertion holes 35 and 46.

The upper bolt 15 is inserted, from the right side, to the first bolt insertion hole 46 provided in the outlet-side passage block 4, and is screwed to the female screw 36B provided in the body 9 of the control valve 2. The lower bolt 16 is inserted, from the left side, to the second bolt insertion hole 35 provided in the body 9 of the control valve 2, and is screwed to the female screw 48 provided in the outlet-side passage block 4.

In a manner as described above, the body (first passage member) 9 of the control valve 2 and the outlet-side passage block (second passage member) 4 are coupled by means of the two bolts 15 and 16, whereby the gasket-type orifice 6 as a seal member is securely fixed.

As shown in FIG. 1, FIG. 2, and FIG. 3, regarding the dimensions of the passage members 4 and 9 of the fixing structure 11 for the seal member, the width thereof is designed to be the smallest, and the fluid passages (the outlet passage 14 and the outlet passage 18) are provided at a middle portion in the width direction. Providing the two bolts 15 and 16 so as to extend in directions opposite to each other allows fastening in which a uniform force is applied onto the gasket-type orifice 6, which is a seal member, without each of the bolts 15 and 16 interfering with the fluid passages (the outlet passages 14 and 18).

Figure 4:
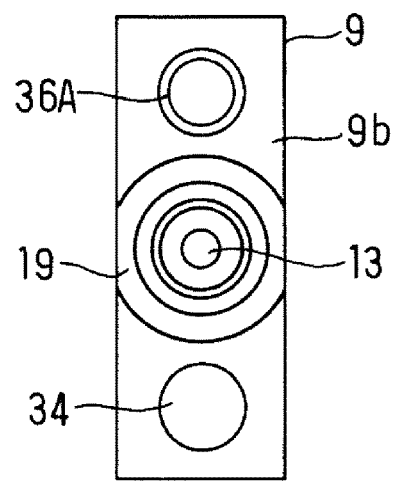
FIG. 4 is a left side view of the body of the control valve.

FIG. 4 is a view of the body 9 of the control valve 2 when seen from the inlet-side passage block 3 side. As shown in FIG. 4, the filter receiving recess 19, the female screw 36A located above the filter receiving recess 19, and the first bolt insertion hole 34 located below the filter receiving recess 19 are exposed to an abutment surface 9b of the body 9, which butts against the inlet-side passage block 3. It is preferable that a distance from the center of the filter receiving recess 19 to the center of the female screw 36A is equal to a distance from the center of the filter receiving recess 19 to the center of the first bolt insertion hole 34.

Figure 5:
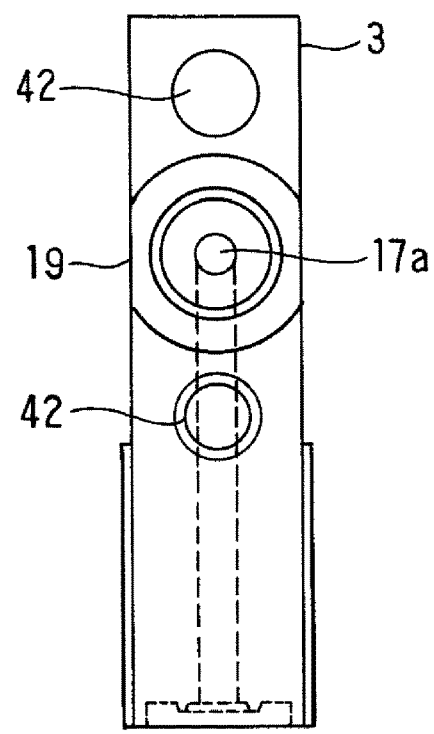
FIG. 5 is a right side view of an inlet-side passage block.

FIG. 5 is a view of the inlet-side passage block 3 when seen from the body 9 side of the control valve 2. As shown in FIG. 5, the filter receiving recess 19, the first bolt insertion hole 40 located above the filter receiving recess 19, and the female screw 42 located below the filter receiving recess 19 are exposed to an abutment surface of the inlet-side passage block 3, which butts against the body 9. It is preferable that a distance from the center of the filter receiving recess 19 to the center of the first bolt insertion hole 40 is equal to a distance from the center of the orifice receiving recess 20 to the center of the female screw 42.

In the fixing structure 11 for a seal member in accordance with the second embodiment, the seal member is the gasket-type filter 7. The fixing structure 11 is constituted by: two upper and lower bolts 15 and 16 as coupling means; female screws 36A and 42 respectively formed in two passage members, that is, the body 9 of the control valve 2 and the inlet-side passage block 3; and the bolt insertion holes 34 and 40.

The upper bolt 15 is inserted, from the left side, to the first bolt insertion hole 40 provided in the inlet-side passage block 3, and is screwed to the female screw 36A provided in the body 9 of the control valve 2. The lower bolt 16 is inserted, from the right side, to the first bolt insertion hole 34 provided in the body 9 of the control valve 2, and is screwed to the female screw 42 provided in the inlet-side passage block 3.

In a manner as described above, the body (first passage member) 9 of the control valve 2 and the inlet-side passage block (second passage member) 3 are coupled by means of the two bolts 15 and 16, whereby the gasket-type filter 7 as a seal member is securely fixed.

As described above, also in this embodiment, providing the two bolts 15 and 16 so as to extend in directions opposite to each other allows fastening in which a uniform force is applied onto the gasket-type filter 7, which is a seal member, without each of the bolts 15 and 16 interfering with the fluid passages (the inlet passages 13 and 17).

Figure 8:
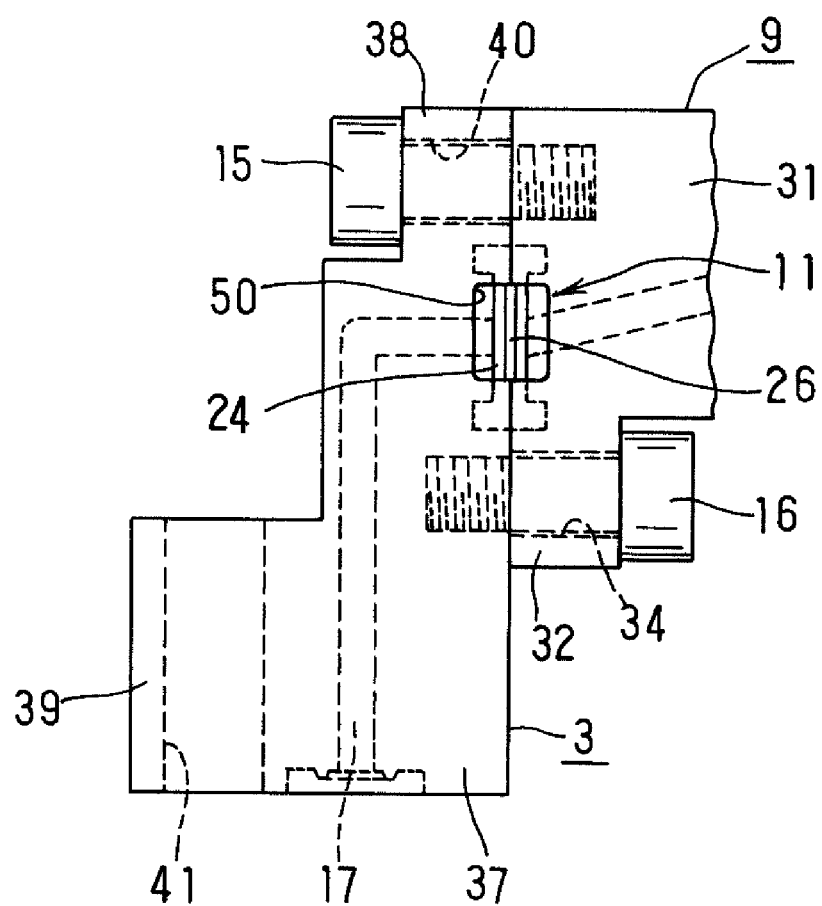
FIG. 8 is a front elevational view of a second embodiment.

In the fixing structure 11 for a seal member in accordance with the second embodiment where the seal member is the gasket-type filter 7, the diameter of the gasket-type filter 7 is not designed to be small enough such that the gasket-type filter 7 fits within the width of the body 9 of the control valve 2 and the width of the inlet-side passage block 3 so as to adapt to the body 9 of the control valve 2 and the inlet-side passage block 3, which are narrow in the width direction, but is designed to be larger than these widths, in some cases. In such a case, the filter receiving recess 19 is formed so as to be exposed to the outside in the width direction. Accordingly, as shown in FIG. 8, when the fixing structure 11 for a seal member is seen from outside, the abutment portion of the body 9 of the control valve 2 and the inlet-side passage block 3 is provided with a window 50, and part of the filter base 24 of the gasket-type filter 7 and part of the retainer 26 are exposed to the outside beyond the window 50.

In accordance with this embodiment, in order to address an issue that there is a risk that a required flow rate cannot be secured when the diameter of the gasket-type filter 7 is reduced so as to adapt to the body 9 of the control valve 2 and the inlet-side passage block 3, which are narrow in the width direction, the diameter of the gasket-type filter 7 can be enlarged whereby reduction in flow rate can be avoided.

It should be noted that, as the above-described fixing structure 11 for a seal member, a joint that couples the first passage member and the second passage member, which have various shapes, may be used. That is, in a joint including: the seal member interposed in the abutment portion of the first and second passage members; coupling means for coupling the first and second passage members; and the fixing structure for the seal member, the fixing structure for a seal member as described above may be used.

INDUSTRIAL APPLICABILITY

The structure for fixing the seal member in accordance with the present invention allows coupling of the passage members with use of two bolts, which allows reduction in widths of the joint and the fluid control apparatus using this structure. This contributes to increase in performance of semiconductor manufacturing equipment using the joint and the fluid control apparatus, and the like.

The invention claimed is:

1. A fixing structure for a seal member in a fluid control apparatus, comprising:
   block-shaped first and second passage members having fluid passages that communicate with each other;
   a seal member interposed in an abutment portion of the first and second passage members; and
   coupling means for coupling the first and second passage members,
   wherein each of the passage members is provided at a middle portion having a width direction thereof with a fluid passage; each of the passage members having two bolts, each bolt threaded in a direction opposite to the other, wherein the threaded direction is perpendicular to an abutment face of the abutment portion, and are used as the coupling means; the middle portion in the width direction of the first and the second passage members has opposite end portions that are each provided with a female screw and a bolt insertion hole to be faced by the female screw; and the first passage member and the second passage member are coupled by a first bolt that is inserted into the bolt insertion hole of the first passage member and is screwed into the female screw of the second passage member and a second bolt that is inserted into the bolt insertion hole of the second passage member and is screwed into the female screw of the first passage member whereby the seal member is securely fixed.

2. The fixing structure for the seal member in the fluid control apparatus according to claim 1, wherein at least one of both passage members has a bending fluid passage.

3. The fixing structure for the seal member in the fluid control apparatus according to claim 1, wherein the seal member is a gasket-type orifice that additionally has a function of an orifice.

4. The fixing structure for the seal member in the fluid control apparatus according to claim 3, wherein the fluid control apparatus is a pressure-based flow rate controller, the first passage member is a body of a control valve, and the second passage member is an outlet-side passage block provided on an outlet side of the body.

5. The fixing structure for the seal member in the fluid control apparatus according to claim 1, wherein the seal member is a gasket-type filter that additionally has a function of a filter.

6. The fixing structure for the seal member in the fluid control apparatus according to claim 5, wherein the gasket-type filter has a diameter that is equivalent to a width of the first passage member and the second passage member, and a filter receiving recess provided at the first passage member and the second passage member is formed so as to be exposed to an outside in a width direction thereof.

7. The fixing structure for the seal member in the fluid control apparatus according to claim 5, wherein the fluid control apparatus is a pressure-based flow rate controller, the first passage member is a body of a control valve, and the second passage member is an inlet-side passage block provided on an inlet side of the body.

8. A joint, comprising:
   block-shaped first and second passage members having fluid passages that communicate with each other;
   a seal member interposed in an abutment portion of the first and second passage members;
   coupling means for coupling the first and second passage members; and
   the fixing structure for the seal member,
   wherein the fixing structure for the seal member is the fixing structure for the seal member in the fluid control apparatus according to claim 1.

9. A fluid control apparatus comprising:
   block-shaped first and second passage members having fluid passages that communicate with each other;
   a seal member interposed in an abutment portion of the first and second passage members;
   coupling means for coupling the first and second passage members; and
   a fixing structure for the seal member,
   wherein the fixing structure for the seal member is the fixing structure for the seal member according to claim 1.

10. The fixing structure for the seal member in the fluid control apparatus according to claim 1, wherein the block-shaped first and second passage members are configured to be coupled to further passage members, having fluid passages, in the same manner as the block-shaped first and second passage members are coupled.

11. A fixing structure for a seal member in a fluid control apparatus, comprising:
    block-shaped first and second passage members having fluid passages that communicate with each other;
    a seal member interposed in an abutment portion of the first and second passage members; and
    coupling means for coupling the first and second passage members,
    wherein each of the passage members is provided at a middle portion having a width direction thereof with a fluid passage; each of the passage members having two bolts, each bolt threaded in a direction opposite to the other, wherein the threaded direction is perpendicular to an abutment face of the abutment portion, and are used as the coupling means; the seal member is a gasket-type filter; the gasket-type filter has a diameter that is equivalent to a width of the first passage member and the second passage member; and a filter receiving recess provided at the first passage member and the second passage member is formed so as to be exposed to an outside in a width direction thereof.

12. The fixing structure for the seal member in the fluid control apparatus according to claim 11,
   wherein the middle portion in the width direction of the first and the second passage members has opposite end portions that are each provided with a female screw and a bolt insertion hole to be faced by the female screw; and
   the first passage member and the second passage member are coupled by a first bolt that is inserted into the bolt insertion hole of the first passage member and is screwed into the female screw of the second passage member and a second bolt that is inserted into the bolt insertion hole of the second passage member and is screwed into the female screw of the first passage member whereby the seal member is securely fixed.

13. A joint, comprising:
   block-shaped first and second passage members having fluid passages that communicate with each other;
   a seal member interposed in an abutment portion of the first and second passage members;
   coupling means for coupling the first and second passage members; and
   the fixing structure for the seal member,
   wherein the fixing structure for the seal member is the fixing structure for the seal member in the fluid control apparatus according to claim 11.

14. A fluid control apparatus comprising:
   block-shaped first and second passage members having fluid passages that communicate with each other;
   a seal member interposed in an abutment portion of the first and second passage members;
   coupling means for coupling the first and second passage members; and
   a fixing structure for the seal member,
   wherein the fixing structure for the seal member is the fixing structure for the seal member according to claim 11.

15. The fixing structure for the seal member in the fluid control apparatus according to claim 11, wherein block-shaped the first and second passage members are configured to be coupled to further passage members, having fluid passages, in the same manner as the block-shaped first and second passage members are coupled.

* * * * *